March 20, 1951
K. L. EMBERSON
2,545,513
RESILIENT SEAT
Filed June 10, 1947
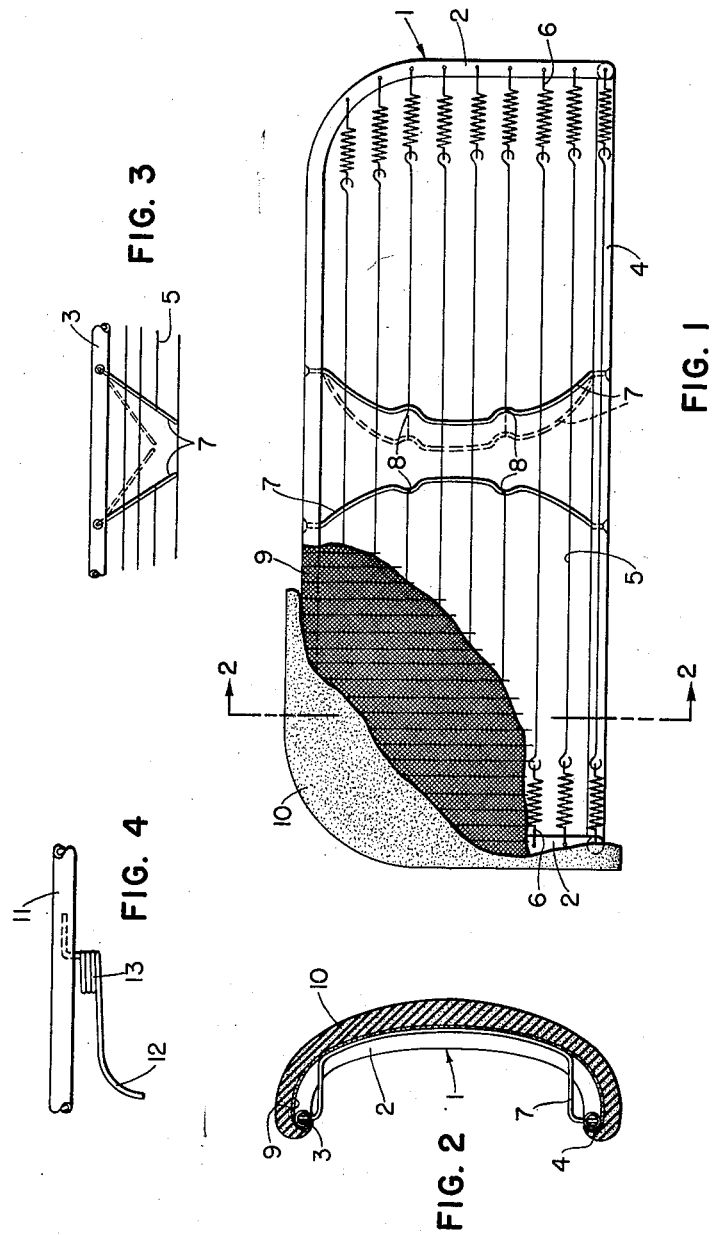
INVENTOR
KEITH L. EMBERSON
BY *R. H. Waters*
ATTORNEY Patented Mar. 20, 1951

2,545,513

UNITED STATES PATENT OFFICE 2,545,513

RESILIENT SEAT

Keith L. Emberson, Akron, Ohio, assignor to Wingfoot Corporation, Akron, Ohio, a corporation of Delaware Application June 10, 1947, Serial No. 753,702

5 Claims. (Cl. 155—179)

This invention relates to seats, and, more particularly, is concerned with resilient seats having a greater length than height, that is, seats adapted to receive more than one person in side by side relation, and is specifically concerned with automobile seat back construction.

Heretofore, it has been the usual practice in constructing seats to employ a suitable frame work supporting a plurality of helical springs positioned over the seating surface and arranged so that the springs are stressed in compression by load applied in a direction parallel to the axis of the springs. Such known seat constructions are open to the objection that they are relatively heavy, space-consuming, and costly. Efforts have been made from time to time to replace the conventional seat structures described with ribbon, zig-zag, or other springs which are less bulky and lighter in weight, but such efforts have not met with much commercial success, and have been subject to breakage and maintenance problems which have resulted in the spring structures being characterized as "cheap."

It is the general object of the invention to avoid and overcome the foregoing and other difficulties of and objections to known seat and spring structures by the provision of an improved, relatively light, durable, comfortable and inexpensive seat structure, and characterized by minimum space requirements.

Another object of the invention is to provide a back for automobile seats, and the like, utilizing resiliently mounted flexible means of inexpensive type for supporting a relatively thin layer of cellular rubber to produce an extremely comfortable and maintenance free structure having minimum space requirements and light weight.

Another object of the invention is the provision of a load supporting seat adapted to receive more than one person and featuring additional resilient means for supporting the load receiving area of the seat.

The foregoing objects of the invention, and other objects which will become apparent as the description proceeds, are achieved by the provision in a seat of a frame, flexible means resiliently supported in the frame and forming a load carrying portion, and additional resilient means backing up the flexible means near the center thereof, said additional resilient means being positioned substantially in a plane which moves angularly with the frame when subjected to load. The structure described is particularly adapted to carry a thin cushioning element, preferably of cellular rubber, the cushion and seat being completed with the usual finish cover of any desired fabric in known manner.

For a better understanding of the invention, reference should be had to the accompanying drawings, wherein:

Fig. 1 is a front elevation, partly broken away, of an automobile seat back incorporating the features of the invention;

Fig. 2 is a vertical sectional view taken substantially on line II—II of Fig. 1;

Fig. 3 is a fragmentary plan view illustrating the angular relation between the frame and the additional resilient back-up means characterizing the invention; and Fig. 4 is a fragmentary side elevational view of a modified resilient back-up spring construction.

In the drawings, the numeral I indicates generally a frame having ends 2, a top 3 and a bottom 4. The frame I can be made up from various materials and in various ways, but one convenient construction is to employ steel tubing in the manner shown with the top 3 of the frame being formed integral with the ends 2, and with the bottom of the frame 4 comprising a straight length of tubing which is welded or otherwise secured at its end to the lower ends of the sides 2 of the frame. As illustrated in the drawings, the ends 2 of the frame are convexly curved forwardly of the seat, although it is to be understood that many of the features of the invention are retained even though the ends of the frame are not convexly curved in the manner illustrated.

Positioned inside of the frame, and of somewhat lesser dimensions than the inside of the frame, is a flexible load-carrying member. This member may take the form of canvas, glass fabric, or other light weight, non-stretchable web material, such as wire netting or mesh, but in the embodiment of the invention shown, the flexible member comprises a plurality of wires 5 which extend in substantially parallel relation transversely of, or from end to end of the frame. The flexible member is adapted to be resiliently secured to the frame, preferably to the ends 2, and this is conveniently accomplished by the use of a plurality of small helically coiled tension springs 6, each spring being secured at one end to one of the wires 5 and being fastened at its other end in holes spaced along the ends 2 of the frame. It is to be understood that the springs 6 are loaded, that is, placed under tension in the construction of the seat so that the flexible load carrying member or wires 5 of the seat are preloaded to provide a resilient load-supporting surface.

Inasmuch as the load receiving area is relatively wide, being adapted to receive at least three people side by side, it is advisable to provide additional resilient supporting means for the load receiving area, member, or members, and this is achieved by the provision of a pair of relatively heavy wire spring members 7. Each spring member 7 is secured at its top to the top 3 of the frame, and at its bottom to the bottom 4 of the frame, in the manner illustrated in the drawing. The spring member 7 is shaped so that it will extend into supporting engagement with the back of the flexible member or members 5, and in the form of the invention illustrated this is achieved by forming each spring member 7 of an arcuate shape. It is to be particularly noted that each spring member 7 is inclined toward the other, and each makes an acute angle, such as angle of about 45°, with the frame, all as illustrated in Fig. 3 of the drawings. Thus, when the load-carrying surface of the seat is subjected to load, particularly at or near the center, the plane of each spring member 7 will be deflected angularly towards the frame. The spring members 7 are usually connected to the frame at points approximately one-third the length of the frame from the ends thereof.

It is usually advisable to secure the flexible member, or members, 5, to the spring members 7 at several points, for example, the points 8, and in the case of the flexible wire members 5, they are terminated at the points 8. This means that when the spring members 7 are stressed to move from the full line to the dotted line position shown, that the tension springs 6 on the other ends of the wires 5 connected to the points 8 will be particularly stressed to increase the resistance to movement of the spring members 7.

The seat structure described is completed in any desired known or conventional manner, but the invention particularly contemplates positioning bias cut burlap 9 of several layers thickness and having transversely extending stiff wire reenforcing means threaded therethrough at closely spaced points over the support previously described. A relatively thin cushion 10, preferably of cellular rubber, is then positioned over the top of the burlap and the finish cover of desired fabric is placed over the cushion to complete the seat assembly.

In Fig. 4 of the drawings is illustrated a modification of the spring members 7. More particularly, Fig. 4 illustrates in fragmentary form a top frame member 11 to which is secured a spring member 12, but the spring member 12 is formed with integral helical coil 13 designed to permit angular movement of the plane of the spring member toward and from the frame 11, all in the manner heretofore described, it being recognized that the end of the spring 12 extending from the top of the coil 13 is received in or secured to the frame 11.

From the foregoing, it will be recognized that the various objects of the invention have been achieved by the provision of a relatively light weight and inexpensive seat structure characterized by comfort, durability and adequate support from end to end of the seat. The seat also provides saving of space over conventional helically coiled spring seats, and in the back illustrated, a relatively large pocket is provided, most of this pocket being available for storage use, knee receiving room for a back seat occupant where the seat of the invention is used as the front seat of an automobile, or the like.

The invention has been illustrated and described as used on the back of an automobile seat, but it is to be recognized that the features of the invention can be incorporated with not only seat backs but bottoms, and in seats of various shapes and adapted to a wide variety of uses.

While in accord with the patent statutes, one embodiment of the invention has been specifically illustrated and described, it is to be particularly understood that the invention is not to be limited thereto or thereby but that the scope of the invention is defined in the appended claims.

What is claimed is:

1. In a seat, an elongated frame of greater length than width substantially surrounding a load-carrying area, the ends of the frame being convexly curved, short coiled tension springs secured to the ends of the frame at short distances apart, flexible wires extending across the load-carrying area and connected to the springs to tension the springs, and a pair of heavy spring wire members, one member being secured to the sides of the frame a distance approximately one third the length of the frame in from the end, and the other member being similarly secured to the other end of the frame, each member having substantially an arcuate shape to conform to the contour of the load-carrying area of the seat and to engage and support the center thereof, each member inclining towards the other, and at least certain of the wires being secured to and terminating at the members.

2. In a seat, an elongated frame of greater length than width substantially surrounding a load-carrying area, short coiled tension springs secured to the ends of the frame at short distances apart, flexible wires extending across the load-carrying area and connected to the springs to tension the springs, a pair of heavy spring wire members, one member being secured to the sides of the frame a distance approximately one third the length of the frame in from the end, and the other member being similarly secured to the other end of the frame, each member having substantially a shape to conform to the contour of the load-carrying area of the seat and to engage and support the center thereof, each member inclining towards the other, and at least certain of the wires being secured to and terminating at the members.

3. In a seat, an elongated frame of greater length than width substantially surrounding a load-carrying area, flexible and resilient means extending from end to end of the frame over the load-carrying area, and a pair of heavy spring wire members, one member being secured to the sides of the frame a distance approximately one third the length of the frame in from the end, and the other member being similarly secured to the other end of the frame, each member having substantially a shape to conform to the contour of the load-carrying area of the seat and to engage and support the center thereof, each member inclining towards the other, and at least certain of the flexible and resilient means being secured to and terminating at the members.

4. A seat back including a frame having convexly forward shaped ends, flexible load-carrying means to cover substantially the area inside the frame, resilient means securing the load-carrying means to the ends of the frame, and a pair of resilient supports for additionally supporting the center of the flexible means, each support comprising a relatively heavy resilient spring wire having one end connected to the top and one end connected to the bottom of the frame a distance about one-third the length of the frame in from the end, the body of the spring wire being shaped to substantially conform to and support the flexible means and being inclined towards the other spring wire so that when the center of the flexible means is subjected to load the plane of the spring wires will move angularly toward the frame, said spring wires being connected to the flexible means.

5. A seat back including a frame, flexible load-carrying means to cover substantially the area inside the frame, resilient means securing the load-carrying means to the ends of the frame, and a pair of resilient supports for additionally supporting the center of the flexible means, each support comprising a relatively heavy resilient spring wire having one end connected to the top and one end connected to the bottom of the frame a distance about one-third the length of the frame in from the end, the body of the spring wire being shaped to substantially conform to and support the flexible means and being inclined towards the other spring wire so that when the center of the flexible means is subjected to load the plane of the spring wires will move angularly toward the frame, said spring wires being connected to the flexible means.

KEITH L. EMBERSON.

REFERENCES CITED

The following references are of record in the file of this patent:

UNITED STATES PATENTS

| Number | Name | Date |
|---|---|---|
| 534,621 | Rooney | Feb. 19, 1895 |
| 817,918 | Johnson | Apr. 17, 1906 |
| 1,904,841 | Watts | Apr. 18, 1933 |
| 2,234,253 | Hopkes | Mar. 11, 1941 |
| 2,311,145 | Widman | Feb. 16, 1943 |

FOREIGN PATENTS

| Number | Country | Date |
|---|---|---|
| 144 | Great Britain | 1900 |
| 201,115 | Germany | Aug. 10, 1908 |
| 542,986 | Germany | Jan. 30, 1932 |